April 28, 1936.  G. E. FARLEY ET AL  2,038,928
FLUID PRESSURE GAUGE
Filed April 6, 1933
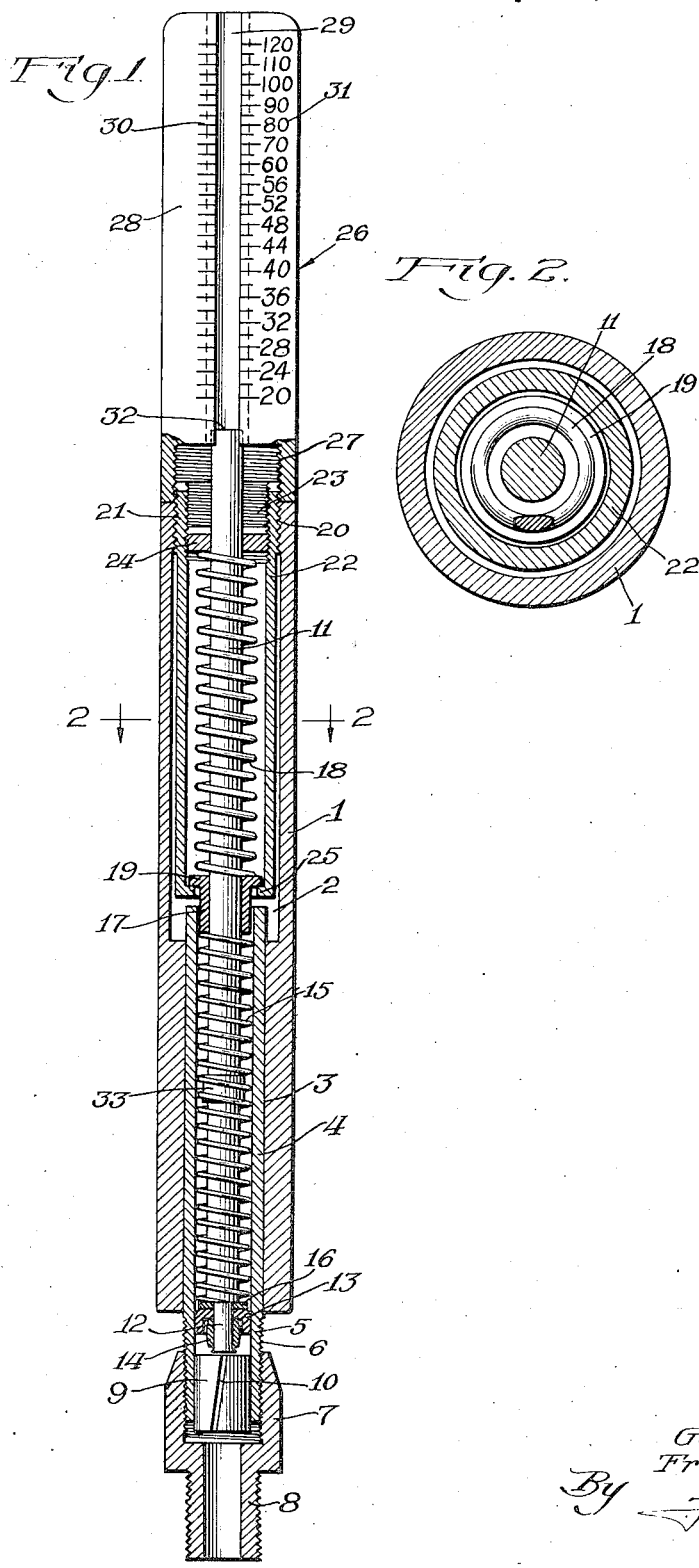
Inventors:
George F. Farley,
Frederick A. Koester,
By Frank L. Belknap
Attorney Patented Apr. 28, 1936

2,038,928

UNITED STATES PATENT OFFICE 2,038,928

FLUID PRESSURE GAUGE

George E. Farley and Frederick A. Koester, South Gate, Calif., assignors to Service Equipment Company, South Gate, Calif., a corporation of California Application April 6, 1933, Serial No. 664,686

4 Claims. (Cl. 73—111)

This invention relates to improvements in pressure gauges, and refers specifically to a gauge for measuring fluid pressures throughout a relatively wide range by the use of a plurality of springs of different tensions which act sequentially, within a single pressure chamber, to resist the fluid pressure established therein.

The utility, objects and advantages of our invention will be apparent from the accompanying drawing and following detail description.

In the drawing, Fig. 1 is a longitudinal sectional view of a pressure gauge utilizing the concept of our invention.

Fig. 2 is a sectional view on line 2—2 of Fig. 1.

Referring in detail to the drawing, 1 indicates a casing of hollow construction which may comprise the body of the gauge. The casing 1 may be constructed of metal such as aluminum, brass, steel or the like, and may be provided with a bore 2 which may extend from one end of the casing to substantially the central portion thereof. A bore 3 may extend from the opposite end of the casing and may connect into the bore 2, the bore 3 being of lesser diameter than bore 2.

A cylindrical tube 4 may be positioned within bore 3 and may be frictionally maintained therein. An end 5 of the tube 4 may protrude from the end of the casing 1 and may be provided with screw threads 6 whereby fitting 7 may be threadedly engaged. The end of fitting 7 may terminate in the threaded nipple 8 by which means the casing 1 may be connected to a source of fluid under pressure (not shown), for instance, an automobile tire.

A block 9 may be positioned within the end 5 of tube 4 and may be provided with a relatively restricted aperture 10 which permits communication between nipple 8 and the interior of tube 4. A rod 11 may be positioned within casing 1 and may terminate at one end in pin 12 of relatively restricted diameter, said pin being adapted to carry cup washer 13 maintained in desired position upon pin 12 by means of collar 14. Washer 13 may be constructed of leather, rubber or other pliable material and may serve as a plunger against which the fluid introduced through the restricted aperture 10 may act. A coil spring 15 may encircle rod 11, one end of said spring being adapted to abut against washer 16 positioned upon pin 12, immediately above cup washer 13. A sleeve 17 may be loosely positioned upon rod 11 and is adapted to contact the opposite end of coil spring 15. In other words, spring 15 is confined upon rod 11 between cup washer 13 and sleeve 17.

A coil spring 18 may also encircle rod 11, one end of said spring abutting against annular flange 19 of sleeve 17. The open end of bore 2 may be provided with threads 20 which may be adapted to engage with cooperating threads 21 provided upon the exterior portion of one end of cylindrical sleeve 22. The inner surface of sleeve 22 may be provided with threads 23 which may be adapted to engage with cooperating threads carried upon the surface of nut 24. Sleeve 22 may extend into bore 2 and may be provided at its opposite end with annular flange 25 which may be loosely positioned about sleeve 17. Spring 18, as can readily be seen, is confined between flange 19 and nut 24.

A member 26 may be positioned at one end of casing 1, said member being provided with threads 27 which may be adapted to engage threads 20 upon the end of sleeve 22. The member 26 may, throughout a major portion of its length, be substantially semi-cylindrical and may be provided with a flat face 28. Said member may also be provided with a longitudinal central aperture 29 which may be coaxially positioned with respect to the bores 2 and 3 whereby rod 11, when moved longitudinally within casing 1, may extend into aperture 29. The member 26 being of substantially cylindrical construction, has a longitudinal opening provided along aperture 29 whereby the position of the end of rod 11, when the same is moved outwardly from casing 1, may be observed. The face 28 of member 26 may be provided with a series of calibrations 30 which may be designated in numerical units 31.

If desired, calibrations (not shown) may be provided upon that portion of rod 11 which projects from the body of the gauge and a datum point may be indicated upon the body of the gauge adjacent the projecting rod. In this manner, the degree of movement of the rod and hence the pressure may be ascertained.

In measuring fluid pressures throughout a relatively wide range, it is substantially impossible to use a single resisting spring and obtain accurate results throughout the entire range of pressures. In order to eliminate the cumulative errors which are inherent in the use of a single spring throughout a wide range of pressures, plural spring gauges have been constructed wherein a plurality of springs of different tensions or weights may be subjected to the pressure of the fluid to be measured and are adapted to act in series or sequentially. However, the gauges of this character have been provided with a plurality of pressure chambers within each of which one of said springs is adapted to operate. As a feature of our invention we may utilize the desirable features of a plural spring gauge and yet provide but one pressure cylinder. In this manner the construction of the gauge is materially simplified and the cost of the device is reduced.

In operation, spring 15 may be of lesser strength or tension than spring 18 and, as has been hereinbefore described, said springs are separated by the sleeve 17 which is loosely positioned upon the rod 11. In other words, sleeve 17 may be described as a floating connection between said springs. When fluid under pressure is introduced through aperture 10 in block 9, said fluid acts upon cup washer 13 and tends to displace the same upwardly. Under normal no load conditions, both springs 15 and 18 may be under a relatively small amount of compression. Consequently, the force of the fluid under pressure acting upon cup washer 13 initially displaces rod 11 against the resistance of spring 15 since said spring is the weaker of the two resisting members. During the initial movements of rod 11, spring 18 retains its original position and said rod moves upwardly through sleeve 17. The initial or low pressure readings may be ascertained by means of the position of end 32 of rod 11 with respect to calibrations 30. A collar 33 may be rigidly mounted upon rod 11 intermediate the distance between sleeve 17 and cup washer 13 when rod 11 is in its normal or no load position. However, as rod 11 moves upwardly due to the action of the fluid pressure, spring 15 is compressed and collar 33 carried by said rod moves upwardly toward sleeve 17. After spring 15 has been compressed to a desirable degree, collar 33 contacts the lower portion of sleeve 17 and, consequently, a rigid connection is established between rod 11 and sleeve 17. If greater fluid pressures act upon cup washer 13, the movement of rod 11 is thereafter resisted by spring 18 and, consequently, the upper range of pressures may be read by correlating the position of end 32 of rod 11 with respect to calibrations 30.

It can readily be seen that the initial or low pressure readings are dependent upon the compression or resistance of spring 15 whereas the upper or higher pressure readings are dependent upon the compression of spring 18. The maximum compression to which spring 15 may be subjected, may be determined or controlled by the position of collar 33 upon rod 11. In this manner spring 18 may be brought into action at substantially any point throughout the range of the gauge at or previous to the total collapsing of spring 15.

Inasmuch as the normal or no load compression of spring 15 is dependent upon the distance between washer 16 and sleeve 17, said compression may be varied by changing the position of sleeve 17 with respect to said washer. Since spring 18 is of greater weight or tension than spring 15, said heaver spring will, when both are normally compressed, overpower spring 15 thereby maintaining sleeve 17 at the lowermost position within sleeve 22. Consequently, by rotating sleeve 22 within casing 1, said sleeve may be raised or lowered, thereby raising or lowering sleeve 17 and decreasing or increasing the normal or no load compression of spring 15. Similarly, the normal or no load compression of spring 18 is dependent upon the distance between sleeve 17 and nut 24. Hence, by rotating nut 24, the same may be raised or lowered with respect to sleeve 22 and the no load compression of spring 18 may be thereby decreased or increased without disturbing the adjustment of spring 15.

It is to be understood, of course, that although my invention is described in conjunction with a gauge having two springs and a single compression chamber, two or more springs may be used with but a single compression chamber, depending upon the pressure range for which the gauge is constructed and the accuracy desired. It is also to be understood that, any means may be utilized to correlate the movement of the indicator rod 11 and the calibrated indicia, since the specific means shown and described is merely exemplary of one of many ways in which the same may be accomplished.

We claim as our invention:

1. A fluid pressure gauge comprising in combination, a tubular casing, a rod positioned coaxially within said casing, a plunger upon one end of said rod, means for applying fluid under pressure to one side of the plunger to move said rod, means for resisting the movement of said rod comprising a plurality of springs of different tension sequentially operating to resist movement of said rod, and means for independently adjusting the tension of said springs.

2. A fluid pressure gauge comprising in combination, a casing having a single pressure chamber, an indicator rod positioned within said pressure chamber, a plunger mounted upon one end of said rod, a plurality of coiled springs of different tension confined under compression upon said rod, said springs being alined in an end to end relation, a sleeve loosely positioned upon said rod between adjacent ends of two springs, means whereby fluid under pressure may act upon said plunger to displace said rod, and fixed means rigidly upon said rod for contacting said sleeve after said rod has been displaced a predetermined distance.

3. A fluid pressure gauge comprising in combination, a casing having a single pressure chamber, an indicator rod positioned within said pressure chamber, a plunger mounted upon one end of said rod, a plurality of springs of different tensions confined under compression upon said rod, means whereby fluid under pressure may act upon said plunger to displace said rod, means upon said rod for compressing the lightest spring during the initial predetermined portion of travel of the plunger, means associating the rod and a heavier spring at a subsequent portion of travel of the plunger, means for independently adjusting the tension of said springs, and means for interpolating effective movement of the rod in desired units.

4. A fluid pressure gauge comprising in combination, a tubular casing, an indicator rod movably positioned within said casing, a plunger carried at one end of said rod, means whereby fluid under pressure may act upon said plunger to displace said rod, means associated with said rod for resisting displacement thereof comprising a plurality of normally compressed coil springs of different tension, a sleeve loosely positioned upon said rod between the ends of adjacent springs, means upon said rod for contacting said sleeve when said rod has moved a predetermined distance against the tension of the weakest spring whereby further movement of said rod is resisted by the adjacent stronger spring, and means for independently adjusting the initial compression of each spring.

GEORGE E. FARLEY.
FREDERICK A. KOESTER.